United States Patent

[11] 3,550,908

[72] Inventors Robert L. Propst
 Ann Arbor;
 James O. Kelley, Saline, Mich.
[21] Appl. No. 731,014
[22] Filed May 22, 1968
[45] Patented Dec. 29, 1970
[73] Assignee Herman Miller Inc.
 Zeeland, Mich.
 a corporation of Michigan

[54] UNIT LOAD HANDLING DEVICE
 11 Claims, 8 Drawing Figs.
[52] U.S. Cl. ................................................ 254/8
[51] Int. Cl. ............................................... B60p 1/48
[50] Field of Search ............................... 254/2—10;
 248/(Inquired); 214/512, 515; 280/47.34, 47.37

[56] References Cited
 UNITED STATES PATENTS
 966,620 8/1910 Taylor ........................ 254/7.6
 1,454,710 5/1923 Drinkwater ................. 280/47.34
 3,095,173 6/1963 Paruolo ....................... 254/7X Primary Examiner—Robert C. Riordon
Assistant Examiner—David R. Melton
Attorney—Price, Heneveld, Huizenga & Cooper ABSTRACT: This disclosure relates to a device for handling unit loads and is particularly adapted to handle those lockers disclosed in U.S. Pat. No. 3,241,898. The device comprises a wheeled vehicle having a supporting platform with upstanding side rails forming handle gripping means at a front edge. The side rails have a locker retaining flange at an upper rear portion thereof to cooperate with a downwardly extending slotted flange on the locker to secure the position of the locker on the supporting platform.

Lifts are provided on the supporting platform to raise the locker to a position where it can be hung on a wall rail. The lift which is actuated by a foot pedal is also used in removing lockers from the wall hanging position.

The device has a sliding handle on a rear portion for pulling the vehicle. The sliding handle is rotatable and slidable on the side rails so as to permit easy removal of the load from the back portion of the device.

A train of carts can be made by attaching the foot pedal to a connecting link which is rotatable relative to the cart from which it extends.

PATENTED DEC 29 1970

INVENTOR
ROBERT L. PROPST
JAMES O. KELLEY

BY Price, Heneveld, Huizenga & Cooper

ATTORNEY

INVENTOR
ROBERT L. PROPST
JAMES O. KELLEY

PATENTED DEC 29 1970

INVENTOR
ROBERT L. PROPST
JAMES O. KELLEY

BY Price, Heneveld, Huizenga & Cooper

ATTORNEY

UNIT LOAD HANDLING DEVICE

This invention relates to a unit load handling device comprising a cart having a frame, wheels attached to the frame, a supporting surface on the frame, side rails extending upwardly from the supporting surface forming side supports for the device, the side rails having a positioning means for a storage unit, which positioning means restrains the movement of the storage units in a direction parallel to the plane of the side rails.

In another of its aspects, the invention relates to a unit load handling device as has been hereinbefore described wherein a handle is formed in the side rails at a front portion thereof.

In another of its aspects the invention relates to a unit load handling device as has been hereinbefore described wherein lifting means are provided on the platform to raise the storage unit off the supporting surface onto a wall support for the unit.

In another of its aspects, the invention relates to a unit load handling device in which the device can be connected together to form a train through a foot pedal which is horizontally stationary and an arm having a hook for connecting to the foot pedal wherein the arm is rotatable about a vehicle axis.

In U.S. Pat. No. 3,241,898, there is disclosed and claimed a method and apparatus for maintaining hospital sterility wherein a plurality of storage units are employed. The storage units can be hung on walls and carts for transporting the units from storage areas to supply or package units are provided. The disclosed cart for transporting the storage unit is L-shaped and has a foot bar for tilting the carts for raising an end of the storage units to hang the same on the wall.

Difficulty has been encountered in positioning the storage units properly on the carts and in lifting the storage units from the carts to the wall hanging position.

I have now discovered an improved cart for handling storage units wherein the cart supports the units, transports the units, has side handles on either the front and back of the cart for pulling and pushing the cart, has means to prevent the storage unit from moving while on the carts and has a means for lifting the storage unit from the carts onto the wall rail.

By various aspects of this invention one or more of the following, or other, objects can be obtained.

It is an object of this invention to provide an improved unit load handling device which can raise the unit onto a wall hanging rail and remove the unit from said rail without tilting the carts.

It is a further object of this invention to provide an improved unit load handling device adapted to remove a unit load from a wall hanging position and insure proper placement of the load on the device.

It is a still further object of this invention to provide an improved load handling device for storage cabinets in which a slidable handle is provided to pull the device, which handle is so constructed such that the load can be removed from the device through the handle end without obstruction from the handle.

It is yet another object of this invention to provide an improved load handling device for removing unit loads from wall hanging positions and transporting the same wherein the load is positively engaged and guided to a proper position on the device.

It is a further object of this invention to provide a unit load handling device which can be attached to another similar device so that a train of such devices can be pulled by a single operator wherein one unit load will follow the same path of the preceding device even while the train is rounding corners.

It is still a further object of this invention to provide linkage for a pair of unit load handling devices wherein compensation is automatically made for uneveness of floor and inclines.

Other aspects, objects, and the several advantages of this invention are apparent to one skilled in the art from a study of this disclosure, the drawings, and the appended claims.

Briefly, the invention comprises a cart having a frame with wheels attached to the frame, a supporting surface on the frame, side rails extending upwardly from the supporting surfaces forming side supports for the cart, the side rails having a positioning means for a storage unit, which positioning means restrains the movement of the storage unit in a direction parallel to the plane of the side rails. Handle means are formed in the side rails at the front position thereof. Further, a slidable handle at the rear portion of the handle is provided to pull the cart when desirable. The handle is so shaped and positioned on the rails that it slides out of the way of the load when it is desirable to remove the load through the handle end of the cart.

Lifting means, coextensive with the supporting surface, are provided to raise and lower the unit load up to and down from a wall hanging position.

The invention will now be described with reference to the accompanying drawings in which.

Figure 1:
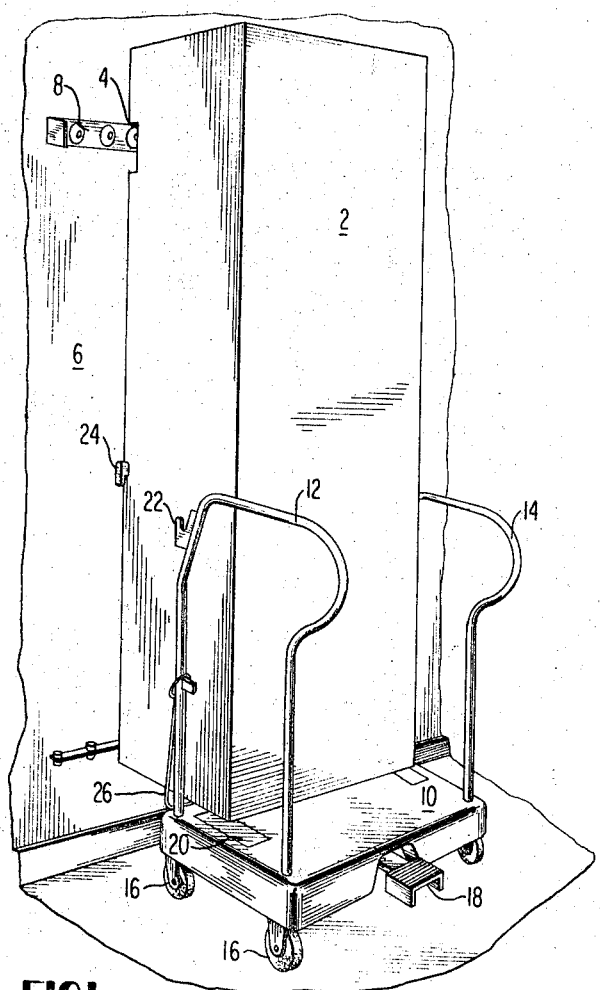
FIG. 1 is a perspective view of a load handling device according to the invention being positioned under a unit load which is hanging on a wall.

Referring now to the drawings a unit load cabinet 2 having a rear rail engaging flange 4 is supported on a wall 6 through a rail 8. The unit load handling device, such as a cart, is positioned beneath the unit load or storage cabinet shown in FIG. 1. The cart comprises a storage platform 10, a pair of rail members 12 extending upwardly from either side thereof and forming handle portions 14 at one end thereof. The device has a plurality of wheels 16 which are attached to the frame. A pedal 18 is provided for actuating a pair of liftable platforms 20 which are normally coextensive with the supporting surface 10.

Figure 2:
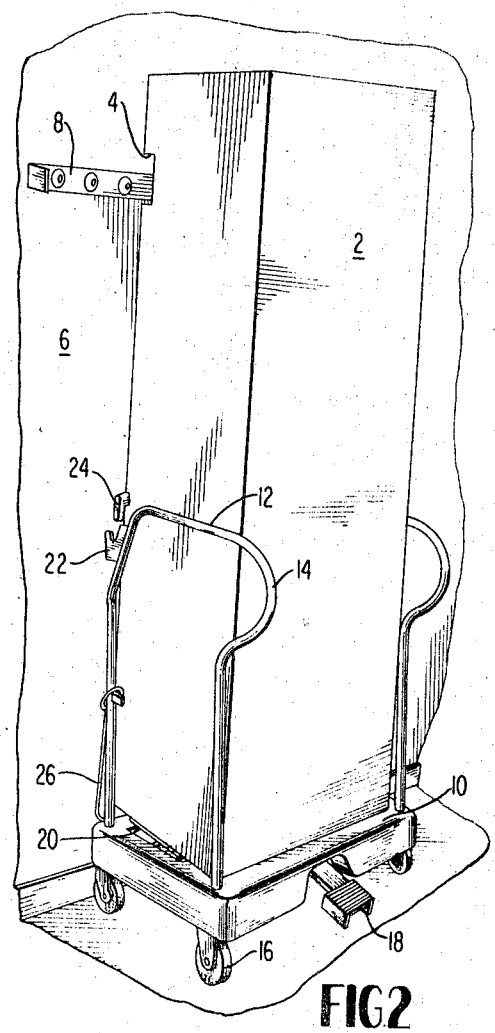
FIG. 2 is a view of the device and unit load shown in FIG. 1 showing the removal of the load from the wall.

When the storage cabinet is to be lifted from the wall position, the cart is placed beneath the same as shown in FIG. 1 and the foot pedal 18 is depressed as shown in FIG. 2. The depressing of the foot pedal will raise the platform 20 to engage the bottom portion of the storage unit. The storage unit will be lifted slightly and can then be moved from the wall and onto the cart (see FIG. 2).

The back portion of the rails 12 have slotted flanges 22 for engaging abutments 24 of the storage unit. In this manner, when the storage unit 2 is lowered from the wall hanging position between the rails, the abutments 22 will positively engage flanges 22 and the upwardly sloping surfaces will cam the abutments 24 into the slot to properly position the storage units on the cart.

Figure 6:
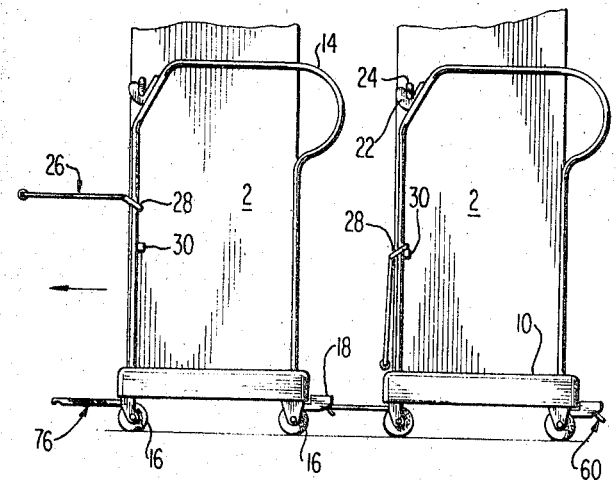
FIG. 6 is a side elevational view showing the interconnection between two similar carts.
Figure 3:
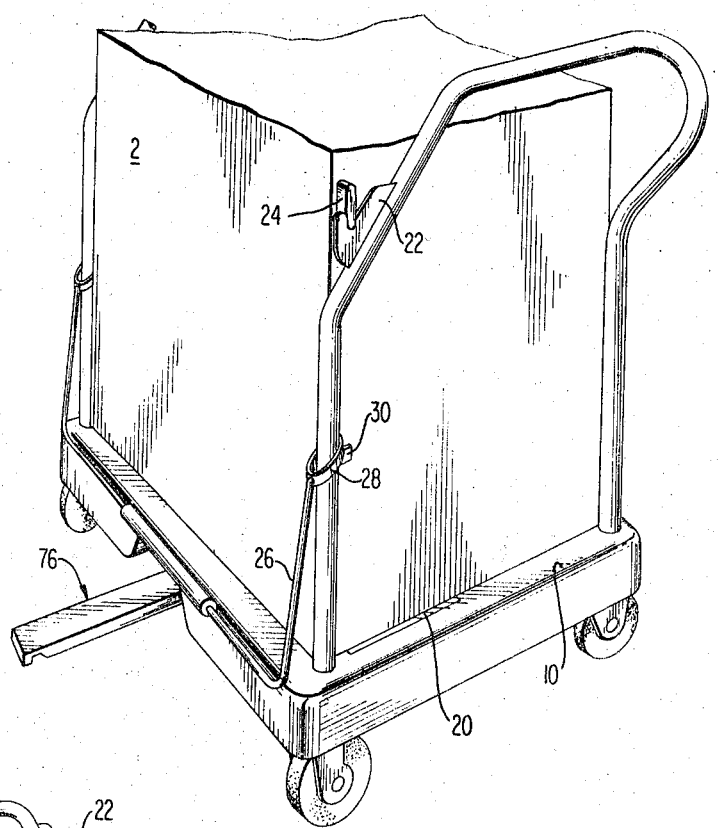
FIG. 3 is a perspective view of the unit load and load handling device shown in FIGS. 1 and 2 from a different perspective.
Figure 4:
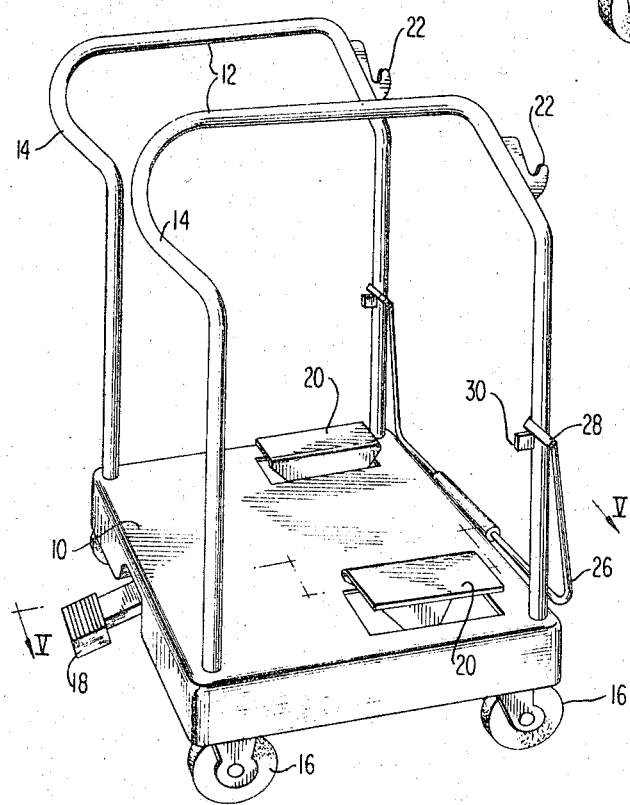
FIG. 4 is a perspective view of the unit load handling device without the unit load position thereon.

A handle 26 is provided on the back portion of the cart for pulling the cart with the unit load attached. As can be best seen in FIGS. 3 and 6, the handle comprises a pair of loops 28 which engage either side rail member 12. The handle is thus slidable upwardly and downwardly on the rail. A stop 30 is provided on one or both of the rails to limit the extent of downward movement of the handle on the rails. As can be seen from FIG. 3, when in the lowermost position, the rear portion of the cart is free to have the load removed therefrom and the handle does not interfere with the load removal. Also, the handle is slidable upwardly as seen in FIG. 6 to provide an adequate handle for pulling the loaded cart.

Figure 5:
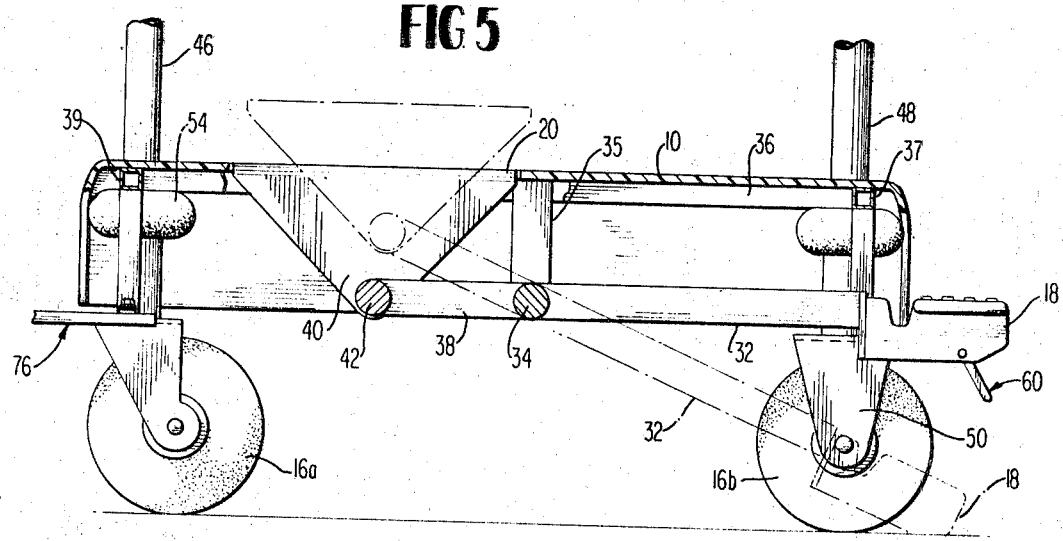
FIG. 5 is a side elevational view partly in section of the device shown in FIG. 4, showing the operation of the lifting platforms in phantom.

The mechanism for actuating the lifting platforms 20 is best seen in FIG. 5. A horizontal bar member 32 is attached to foot pedal 18. The horizontal bar member 32 is rigidly attached to a pivot rod 34 which in turn is rotatably supported by flange 35. A frame member 36 supports flange 34. A pair of actuating members 38 are rigidly attached to rotatable bar member 34 and the movement of the pedal is transmitted through these members 38 to lift platforms 28. A connecting bar 42 and a flange 40 attaches the lifting platforms 28 to the actuating members 38.

The frame of the device is constructed of four members 36, 37, 39 which are connected together at tubes like 46 and 48. The front wheels 16a (FIG. 5) are pivotable about their supporting shafts which fit into tube 46. The back wheels 16b are not pivotable and have vertical shafts attached to 50 and positioned within tube 48. Conventional bearings can be provided for the front wheels 16a to permit them to pivot easily. The supporting rails 36, 37, and 39 are attached to the top portion of the tubes 46 and 48.

The supporting platform 10 has downwardly extending flanges at the sides thereof and is positioned directly on the frame. This supporting platform is preferably made from a moldable thermoplastic material and can be easily vacuum formed. The platform is positioned by gaskets 54 which are positioned on each tubular member. The gaskets 54 abut against the side flanges of the platform and are preferably made of a yieldable rubber material. The gaskets 54 also provide a cushioning effect for the cart in the event that the platform flanges bump up against other surfaces.

Figure 7:
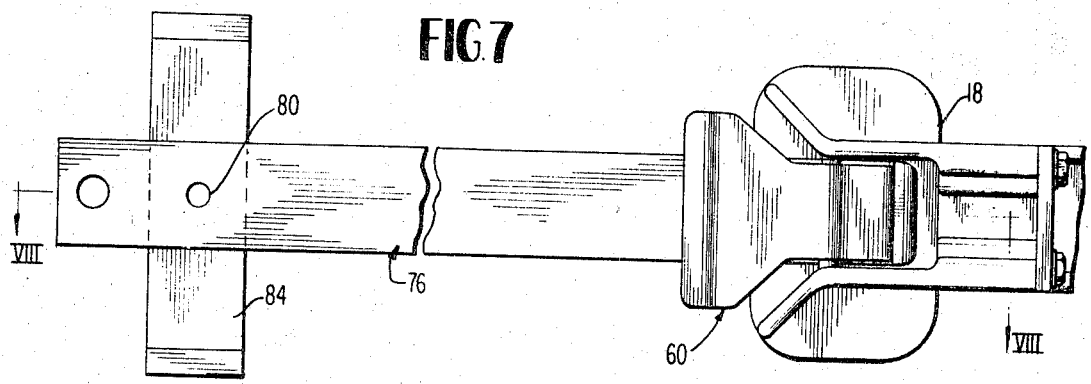
FIG. 7 is a bottom view of the linkage between the carts shown in FIG. 6.
Figure 8:
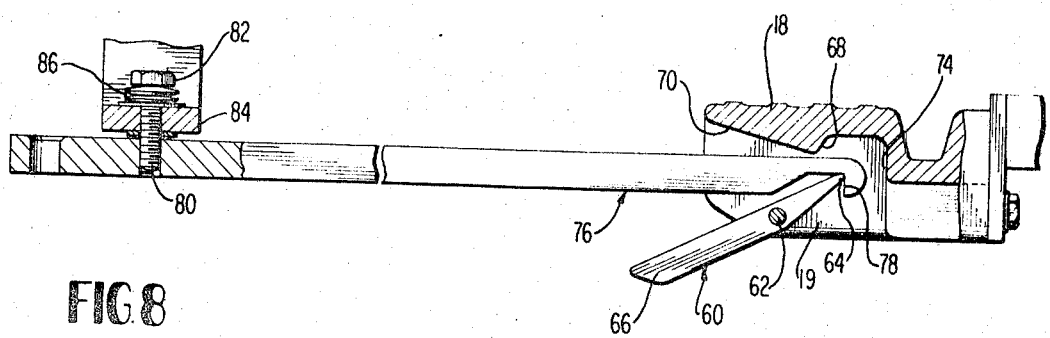
FIG. 8 is a sectional view along lines VIII–VIII of FIG. 7.

Referring now to FIGS. 6 through 8, the foot pedal 18 has an inverted U-shaped configuration with a pair of downwardly extending flanges 19. A ratchet lock 60 is rotatably supported on the downwardly extending flanges 19 through a pin 62. The rachet lock has an upwardly extending locking edge 64 which normally abuts against a nose 68 beneath the top portion of the foot pedal 18. The inverted U-shaped configuration of the foot pedal 18 provides a receiving area for a connecting link 76. The foot pedal 18 has an inner camming surface 70 which extends downwardly and inwardly from the upper top surface of the foot pedal forming nose 68 to provide a camming surface for the end of connecting link 76. When the link 76 is inserted into the foot pedal, the end of the link 76 will push the locking edge 64 of ratchet lock 60 causing a small degree of rotation of the ratchet lock. An inner surface 74 is provided with foot pedal 18 to stop the extent of inward motion of link 76. When the link 76 is pulled outwardly, the hook 78 will be retained between nose 68 and ratchet lock 60.

When it is desirable to disconnect the two carts, handle release portion 66 of ratchet lock 60 is pushed upwardly while the connecting link is pulled from the inner portion of the foot pedal 18.

Connecting link 76 is rotatably supported by pin 80 on frame member 84 of the cart. A nut 82 secures the top portion of the pin to the frame member 84. A pair of Belleville springs 86 are positioned between the nut 82 and the frame to provide a small degree of flexibility of the connector link 76.

The connector link 76 is rotatable about a vertical axis and has a small amount of flexibility in a vertical direction to permit a small degree of rotation about a horizontal axis. This flexibility in the vertical direction permits the linkage to compensate for floor unevenness and for inclines which are quite frequently present, for example, in connecting portions of separate buildings.

The downwardly and inwardly extending cam surface 70 of foot pedal 18 also permits a certain degree of relative rotation about a horizontal axis between the foot pedal 18 and connecting link 76 to compensate for floor unevenness and inclines.

It is to be noted that connecting link 76 is rotatable about a vertical axis whereas lever 32 connecting foot pedal 18 is stationary relative to a vertical axis. Thus, when a series of carts are connected through connecting links wherein a foot pedal of a lead cart is connected to a connecting link of a second cart, the turning of a corner by the lead cart will cause the other carts in the train to turn the corner at the same point as the lead cart. Thus, this kind of linkage structure permits the train to be handled by a single operator, thereby reducing labor costs.

Reasonable variation and modification are possible within the scope of the foregoing disclosure, the drawings, and the appended claims without departing from the spirit thereof.

We claim:

1. A unit load handling device comprising a cart having a frame, wheels attached to said frame, a supporting surface on said frame, side rails extending upwardly from said supporting surface forming side supports for said cart, said side rails having a positioning means for a storage unit, which positioning means restrains movement of said storage unit in a direction parallel to the plane of said side rails; and, handle means extending from a rear portion of said side rails, said handle means being slidable with respect to said side rails, said cart further including restraining means for limiting the extent of sliding movement of said handle means on said side rails.

2. A unit load handling device adapted to receive, transport and discharge unit loads, said loads having abutment means at each side thereof, said device comprising a cart having a frame, wheels attached to said frame, a supporting surface having two sides attached to said frame, side rails extending upwardly from each of said two sides of said supporting surface forming side supports for said cart, each of said side rails having a positioning means affixed thereto, said positioning means being adapted to engage and disengage said abutment means upon relative vertical movement of said cart and said load, said positioning means engaging said abutment means when said load is resting on said supporting surface to restrain movement of said load with respect to said cart in a direction parallel to said sides.

3. A unit load handling device according to claim 2 wherein a handle is formed in each side rail at a front portion thereof.

4. A unit load handling device according to claim 1 wherein said handle means is so shaped such that when said handle means is in the lowermost position against said restraining means, the bottom of said handle means is at least as low as the top of said supporting surface so as to permit easy removal of a load from the rear portion of said cart.

5. A unit load handling device according to claim 2 wherein lifting means are provided on said supporting surface to lift said storage unit upwardly from said positioning means onto a wall support for said unit load.

6. A unit load handling device comprising a cart having a frame, wheels attached to said frame, a supporting surface on said frame, and lifting means coextensive with said supporting surface adapted to raise a load positioned on said surface a predetermined amount, said lifting means including a pair of platforms coextensive with said supporting surface, said platforms having depending flanges, said depending flanges being attached to a pivotable rod which is secured to said frame and pivotable about a point of attachment to said frame, said pivotable rod having actuating means extending out from a side of said device for raising and lowering the platform by depressing the actuating means.

7. A unit load handling device comprising a cart having a frame, wheels attached to said frame, a supporting surface on said frame, and lifting means coextensive with said supporting surface adapted to raise a load positioned on said surface a predetermined amount, said lifting means being actuated by a depressible foot pedal carried by a linkage, said foot pedal and said lifting means being nonrotatable about a vertical axis, said foot pedal extending out of the bottom portion of one end of said cart; a connecting link extending out of the other end of said cart, opposite said foot pedal, said connecting link being rotatable about substantially vertical axis, said connecting link and said foot pedal having releasable interengaging means on the ends thereof so that said connecting link of one cart can be releasably engaged by said foot pedal of another cart to make a trainlike arrangement.

8. A unit load handling device according to claim 7 wherein said link is rotatable about said vertical axis so as to be positioned beneath said cart structure when not in use.

9. A unit load handling device according to claim 7 wherein said link is attached to said foot pedal through a vertically extending pin and said pin has spring means between the end thereof and said frame to permit a small degree of vertical movement of said link relative to said frame to compensate for floor unevenness when said carts are connected.

10. A unit load handling device according to claim 7 wherein said foot pedal comprises an inverted U-shaped shell with a locking linkage rotatably supported therein, said locking linkage having an end which normally abuts against the top under side of said inverted U-shaped shell; said connecting link has a hook portion on the under side of the engaging end thereof, said hook is adapted to fit between the upper under side of said inverted U-shaped portion, said hook being engageable by said locking linkage end to retain said hook between said top underside of said inverted U-shaped shell and said end of locking linkage.

11. A unit load handling device according to claim 10 wherein said upper under surface of said inverted U-shape portion extends upwardly and outwardly to provide a camming surface for said engaging end of said connecting link, and to provide a small degree of relative rotatability between said foot pedal and said connecting link to compensate for floor unevenness.

PO-1050
(5/69)

UNITED STATES PATENT OFFICE
CERTIFICATE OF CORRECTION

Patent No. 3,550,908            Dated December 29, 1970

Inventor(s) Robert L. Propst and James O. Kelley

It is certified that error appears in the above-identified patent and that said Letters Patent are hereby corrected as shown below:

Column 4, line 44;

"said storage unit upwardly" should be --- said unit load upwardly ---.

Signed and sealed this 25th day of January 1972.

(SEAL)
Attest:

EDWARD M. FLETCHER, JR.          ROBERT GOTTSCHALK
Attesting Officer                Commissioner of Patents